United States Patent
Howard

(10) Patent No.: US 7,164,384 B2
(45) Date of Patent: Jan. 16, 2007

(54) COMBINATION BIOMETRIC AND/OR MAGNETIC SENSING FUNCTIONALITIES AND/OR GPS WITH RADIO FREQUENCY TRANSPONDER FUNCTIONALITY ON AN INTELLIGENT LABEL

(75) Inventor: John B. Howard, Wildwood, MO (US)

(73) Assignee: MAI Capital Holdings, Inc., Boston, MA (US)

( * ) Notice: Subject to any disclaimer, the term of this patent is extended or adjusted under 35 U.S.C. 154(b) by 92 days.

(21) Appl. No.: 10/633,302

(22) Filed: Aug. 4, 2003

(65) Prior Publication Data

US 2004/0061324 A1 Apr. 1, 2004

Related U.S. Application Data

(63) Continuation-in-part of application No. 10/005,187, filed on Dec. 7, 2001, now Pat. No. 6,614,392.

(51) Int. Cl.
*H04B 7/185* (2006.01)
*G01S 5/02* (2006.01)

(52) U.S. Cl. .............. 342/357.07; 342/357.06

(58) Field of Classification Search .............. 342/51, 342/357.06, 357.07, 357.09, 42, 44; 701/213, 701/215; 340/825.36, 551, 571, 572.1, 825.3, 340/825.34, 825.49
See application file for complete search history.

(56) References Cited

U.S. PATENT DOCUMENTS

| | | | | |
|---|---|---|---|---|
| 5,430,441 A | * | 7/1995 | Bickley et al. ............. 340/10.2 |
| 5,557,085 A | * | 9/1996 | Tyren et al. ................. 235/380 |
| 5,574,470 A | | 11/1996 | De Vall |
| 5,626,630 A | | 5/1997 | Markowitz et al. |
| 5,815,091 A | * | 9/1998 | Dames et al. .......... 340/870.34 |
| 5,903,225 A | * | 5/1999 | Schmitt et al. ............ 340/5.25 |
| 5,942,977 A | | 8/1999 | Palmer et al. |
| 5,959,568 A | * | 9/1999 | Woolley ....................... 342/42 |
| 6,019,965 A | * | 2/2000 | Dunn et al. ................ 424/85.1 |
| 6,232,880 B1 | | 5/2001 | Anderson et al. |
| 6,323,782 B1 | | 11/2001 | Stephens et al. |
| 6,353,406 B1 | | 3/2002 | Lanzl et al. |
| 6,393,045 B1 | * | 5/2002 | Belcher et al. ............. 375/130 |
| 6,441,778 B1 | * | 8/2002 | Durst et al. ............ 342/357.07 |
| 6,614,392 B1 | * | 9/2003 | Howard .............. 342/357.07 |
| 6,720,712 B1 | * | 4/2004 | Scott et al. .................. 310/339 |
| 2001/0055411 A1 | * | 12/2001 | Black ......................... 382/124 |
| 2002/0014953 A1 | * | 2/2002 | Stephens et al. ........... 340/5.61 |
| 2002/0178369 A1 | * | 11/2002 | Black ......................... 713/186 |
| 2003/0001722 A1 | * | 1/2003 | Smith ......................... 340/5.61 |
| 2004/0140900 A1 | * | 7/2004 | Barber et al. ............ 340/573.2 |

(Continued)

Primary Examiner—Dao L. Phan
(74) Attorney, Agent, or Firm—Foley & Lardner LLP

(57) ABSTRACT

A intelligent label comprising a radio frequency transponder coupled to a global positioning system, a magnetic field sensing system, and/or a fingerprint sensor system, all of which are attached to a substrate. Once the intelligent label utilizing a global positioning system is attached to an object, it will enable the object to be tracked as it moves from one point to another point. As the object moves, the global positioning system receives signals from GPS satellites and processes those signals into location data. The data is then either transmitted directly to an interrogation station by the radio frequency transponder, or stored in a memory. The memory serves to allow all or part of the previous location data to be stored for transmittal to an interrogator at a later date.

35 Claims, 6 Drawing Sheets

U.S. PATENT DOCUMENTS

| | | | |
|---|---|---|---|
| 2005/0001725 A1* | 1/2005 | Brady et al. | 340/572.7 |
| 2005/0029343 A1* | 2/2005 | Neymann | 235/380 |
| 2005/0088314 A1* | 4/2005 | O'Toole et al. | 340/825.36 |
| 2005/0108096 A1* | 5/2005 | Burger et al. | 705/14 |
| 2005/0116810 A1* | 6/2005 | Beenau et al. | 340/5.52 |

* cited by examiner

COMBINATION BIOMETRIC AND/OR MAGNETIC SENSING FUNCTIONALITIES AND/OR GPS WITH RADIO FREQUENCY TRANSPONDER FUNCTIONALITY ON AN INTELLIGENT LABEL

RELATED APPLICATIONS

The present application is a Continuation-In-Part of U.S. patent application Ser. No. 10/005,187 filed on Dec. 07, 2001 now U.S. Pat. No. 6,614,392, to the same inventor, entitled "Combination RFID and GPS Functionality on an Intelligent Label," the contents of which are incorporated by reference herein in its entirety.

BACKGROUND OF THE INVENTION

The present invention relates generally to tracking and/or monitoring/verifying access a letter, package, or other movable object, and more particularly to a positioning device, a memory device, a radio frequency transponder and/or a fingerprint scanner embedded in a label or other thin object.

There is a desire on the part of both individuals and corporations to be able to track or locate or verify access/receipt or control access to packages, letters, and other movable objects placed in the stream of commerce, as well as household goods and valuables that become lost or stolen. In many cases, these items tend to have a high dollar and or a high sentimental value, or are extremely time-sensitive. The incidences of lost or misplaced or misdirected cargo can detract significantly from the bottom line of both transportation companies and the uninsured owners of the goods. Keeping track of where a particular package is located is a labor intensive task for the transportation company handling the goods, and the consumer must rely on the shipping company to actively inform him or her of the past whereabouts of the package, which tends to consist of posting the information on the shipper's web site. Usually, the information known to the shipper is restricted to the location where the package handler physically obtained the package and actively identified the package using, for example, an optical scanner. While radio frequency identification has been implemented in an effort to automate the process (i.e. eliminate the human package handler), the basic problem still remains: information cannot be easily obtained concerning the whereabouts of the package between the active identification locations. Because of this, a low cost, uncumbersome, and unobtrusive means is needed to provide accurate tracking information of a package or other moveable object. Still further, it is difficult to quickly and conveniently verify that someone has accessed a package, or that someone should not access a package.

Radio frequency identification systems rely on radio frequency transponders to transfer information to interrogation stations. Unlike other information communication systems, radio frequency transponder systems are not restricted to line of sight or hard wire communications, and are most desirable where wireless communications are a necessity. Information transferred by a radio frequency transponder system typically comprises identification data, but can also include messages, depending on the sophistication of the electronics used in the system.

Radio frequency identification systems include an interrogator, which typically employ an exciter that transmits a radio frequency excitation signal, and a transponder. The transponder is energized by the excitation signal to transmit a signal, including an identification code or other information, back to the interrogator. The transponder receives a radio frequency signal, or, more specifically, is energized by the radio frequency magnetic field and forms a response signal that will identify the transponder and which may provide additional information, and then transmits the response signal to the interrogator. The interrogator includes a receiver that receives the response signal and processes the information it contains. This information is then recorded by a data management system for access by the end user.

One method of radio frequency identification works on an inductive principle. Here, an interrogation station generates a magnetic field at a predetermined frequency. When the transponder enters the field, a small electric current forms in the transponder, providing power to the radio frequency identification electronic control components which then modulate the magnetic field in order to transmit the transponder's programmed data back to the interrogator. The interrogator receives the signal transmission, demodulates and decodes the transmission, and sends the data on to a host computer for further processing.

Radio frequency transponders are classified as either passive or active. Passive radio frequency transponders extract their power from the electromagnetic field provided by the interrogator, while an active radio frequency transponder includes a radio transceiver and a battery power source to enable it to transmit a signal to a remote receiver. The advantage to using active transponders is that they typically have increased range over passive transponders, but the disadvantage is that they require a battery power source to achieve that increased range.

SUMMARY OF THE INVENTION

Briefly, the present invention comprises an intelligent label comprising, in one embodiment, a radio frequency transponder coupled to a global positioning system and a substrate, the radio frequency transponder and the global positioning system being attached to the substrate.

In an embodiment of the invention, there is an intelligent label comprising a radio frequency transponder coupled to a fingerprint sensor system and/or a global positioning system and/or a magnetic field sensing system and a substrate, said radio frequency transponder and said fingerprint sensor system being attached to said substrate.

In another embodiment of the invention, there is an intelligent label comprising a radio frequency transponder coupled to a fingerprint sensor system and/or a magnetic field sensing system and/or a global positioning system and a substrate, said substrate comprising a liner and a face stock, wherein said radio frequency transponder and a portion of said fingerprint sensor system are positioned between said liner and said face stock, said liner being secured to said face stock.

In some embodiments of the present invention, there is a method of making an intelligent label, comprising the steps of obtaining a substrate comprising a pressure sensitive face stock and a release liner; delaminating said substrate by peeling off said release liner to expose an adhesive on said pressure sensitive face stock obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor system and/or magnetic field sensing system and/or global positioning system, transferring a web cutting to the adhesive exposed on said pressure sensitive face stock of said substrate; and, relaminating said release liner onto said pressure sensitive face stock to cover a portion or all of said web cutting.

In another embodiment of the present invention, there is a method of making an intelligent label, comprising the steps of, obtaining a substrate comprising a pressure sensitive face stock and a release liner, delaminating said substrate by peeling off said release liner to expose said pressure sensitive face stock, pattern coating said pressure sensitive face stock with a hot melt adhesive, obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor system and/or magnetic field sensing system and/or global positioning system, transferring a web cutting to said pressure sensitive face stock of said substrate, and relaminating said release liner onto said pressure sensitive face stock to cover a portion or all of said web cutting.

In another embodiment of the present invention, there is a method of making an intelligent label, comprising the steps of obtaining a non-pressure sensitive substrate, obtaining a laminate, pattern coating said non-pressure sensitive substrate with an adhesive, obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor systems and/or magnetic field sensing systems and/or global positioning systems, transferring a web cutting to one of said laminate and said non-pressure sensitive substrate, and pressing said non-pressure sensitive substrate onto said laminate to cover said web cutting in the area around at least a portion of the fingerprint sensor system.

In a further aspect of the present invention, the radio frequency transponder comprises at least one antenna and at least one integrated circuit chip.

In a further aspect of the present invention, the global positioning system comprises at least one antenna, at least one receiver, and at least one processor.

In a further aspect of the present invention, the global positioning system comprises at least one antenna and at least one integrated circuit chip.

In a further aspect of the present invention, the radio frequency transponder includes a memory for storing data.

In a further aspect of the present invention, the fingerprint sensor system and/or the global positioning system and/or the magnetic field sensing system includes a memory for storing data.

In a further aspect of the present invention, the invention further comprises at least one memory chip coupled to at least one of the radio frequency transponder and the fingerprint sensor system and/or the global positioning system and/or the magnetic field sensing system.

In a further aspect of the present invention, the invention further comprises a computer connected to at least one of the radio frequency transponder and the fingerprint sensor system and/or the global positioning system and/or the magnetic field sensing system.

In a further aspect of the present invention, the invention further comprises a power source connected to at least one of the radio frequency transponder and the fingerprint sensor system and/or the global positioning system and/or the magnetic field sensing system.

In a further aspect of the present invention, the power source comprises a printed battery.

In a further aspect of the present invention, the radio frequency transponder and the fingerprint sensor system and/or the global positioning system and/or the magnetic field sensing system are embedded in the substrate.

In a further aspect of the present invention, the substrate is at least part of one of a label, a badge, a package, a container, an envelope, a box, a piece of cardboard and a piece of paper.

In a further aspect of the present invention, the substrate is made from at least one of paper, synthetic paper, plastic, metal, cloth and glass.

In a further aspect of the present invention, the substrate is a label, the label comprising a front side and a back side, the back side being provided with adhesive.

In a further aspect of the present invention, the intelligent label is dimensioned to fit into a standard 4.125 inch by 9.5 inch U.S. mail envelope.

In a further aspect of the present invention, the invention further comprises at least one antenna shared by the radio frequency transponder and the fingerprint sensor system and/or the global positioning system and/or the magnetic field sensing system.

In a further aspect of the present invention, the invention further comprises at least one power source shared by the radio frequency transponder and the fingerprint sensor system and/or the global positioning system and/or the magnetic field sensing system.

In a further aspect of the present invention, the power source comprises a printed battery.

In a further aspect of the present invention, the invention further comprises a memory for storing data, the memory being shared by the radio frequency transponder and the fingerprint sensor system and/or the global positioning system and/or the magnetic field sensing system.

In a further aspect of the present invention, the radio frequency transponder and the fingerprint sensor system and/or the global positioning system and/or the magnetic field sensing system share a common processor.

In a further aspect of the present invention, the filler material is provided around the radio frequency transponder and the fingerprint sensor system and/or the global positioning system and/or the magnetic field sensing system to provide a label of uniform thickness.

In a further aspect of the present invention, the intelligent label comprises a radio frequency transponder coupled to a fingerprint sensor system and/or a global positioning system and/or a magnetic field sensing system system, and a substrate, where the substrate comprising a liner and a face stock, wherein the radio frequency transponder and the fingerprint sensor system and/or the global positioning system and/or the magnetic field sensing system are positioned between the liner and the face stock, the liner being secured to the face stock.

In a further aspect of the present invention, the intelligent label comprises a radio frequency transponder coupled to the fingerprint sensor system and/or the global positioning system and/or the magnetic field sensing system, and a substrate, the substrate comprising a liner and a face stock, wherein the radio frequency transponder and the fingerprint sensor system and/or the global positioning system and/or the magnetic field sensing system is positioned between the liner and the face stock, the liner or the face stock being secured to at least one of the radio frequency transponder and the fingerprint sensor system and/or the global positioning system and/or the magnetic field sensing system.

In a further aspect of the present invention, the liner and the face stock is secured to at least one of the radio frequency transponder and the fingerprint sensor system and/or the global positioning system and/or the magnetic field sensing system.

In a further embodiment of the present invention, there is a method of making an intelligent label comprising the steps of obtaining a radio frequency transponder coupled to the fingerprint sensor system and/or the global positioning system and/or the magnetic field sensing system, and attaching the radio frequency transponder and the global positioning system to a substrate.

In a further aspect of the present invention, the radio frequency transponder comprises at least one antenna and at least one integrated circuit chip.

In a further aspect of the present invention, the global positioning system comprises at least one antenna, at least one receiver, and at least one processor.

In a further aspect of the present invention, the attaching step comprises embedding the radio frequency transponder and the fingerprint sensor system and/or the global positioning system and/or the magnetic field sensing system in the substrate.

In a further embodiment of the present invention, there is a method of making an intelligent label, comprising the steps of obtaining a substrate comprising a pressure sensitive stock and a liner, delaminating the substrate by peeling off the liner to expose an adhesive on the pressure sensitive stock, obtaining a continuous web comprising radio frequency transponders coupled to global positioning systems, cutting the web to produce web cuttings, whereby each web cutting comprises at least one radio frequency transponder coupled to at least one global positioning system, transferring a web cutting to the adhesive exposed on the pressure sensitive stock of the substrate, and relaminating the liner onto the pressure sensitive stock thereby covering the web cutting.

In a further embodiment of the present invention, there is method of making an intelligent label, comprising the steps of obtaining a substrate comprising a pressure sensitive stock and a liner, delaminating the substrate by peeling off the liner to expose the pressure sensitive stock, pattern coating the pressure sensitive stock with a hot melt adhesive, obtaining a continuous web comprising radio frequency transponders coupled to global positioning systems, cutting the web to produce web cuttings, whereby each web cutting comprises at least one radio frequency transponder coupled to at least one global positioning system, and transferring a web cutting to the pressure sensitive stock of the substrate, relaminating the liner onto the pressure sensitive stock thereby covering the web cutting.

In a further embodiment of the present invention, there is method of tracking or identifying an object, comprising the steps of obtaining an intelligent label comprising a radio frequency transponder coupled to a global positioning system, the radio frequency transponder and the global positioning system being attached to a substrate, attaching or inserting the intelligent label to the object to be tracked or identified, and tracking or identifying the object to be tracked or identified.

In a further aspect of the present invention, the tracking step comprises receiving signals from an appropriate number of GPS satellites, processing the signals into location data, and storing the location data in a memory.

In a further aspect of the present invention, the tracking step further comprises retrieving the location data from the memory.

In a further aspect of the present invention, the tracking step further comprises transmitting the location data.

In a further aspect of the present invention, the tracking step further comprises analyzing the location data retrieved from the memory.

In a further aspect of the present invention, the tracking step comprises, receiving signals from an appropriate number of GPS satellites, processing the signals into location data, and transmitting the location data.

In a further aspect of the present invention, an interrogation station receives the transmitted location data.

In a further aspect of the present invention, the identifying step comprises transmitting an identification signal.

In a further embodiment of the present invention, there is a method of tracking and identifying an object, comprising the steps of, obtaining an intelligent label comprising a radio frequency transponder coupled to a global positioning system, the radio frequency transponder and the global positioning system being attached to a substrate, attaching or inserting the intelligent label to the object to be tracked or identified, and tracking and identifying the object to be tracked and identified

DETAILED DESCRIPTION OF SOME OF THE EMBODIMENTS

Figure 1:
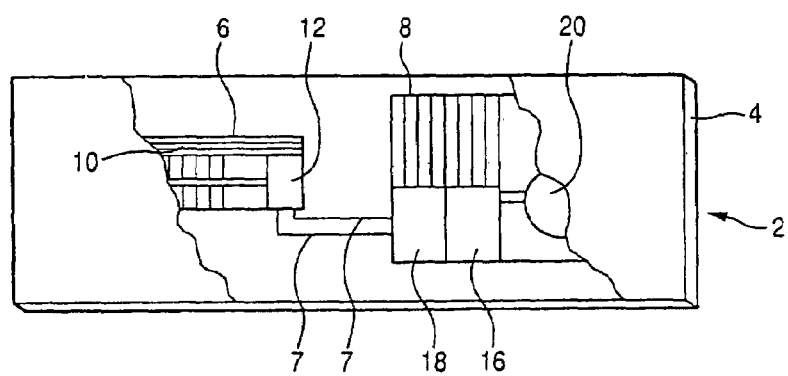
FIG. 1 is a schematic diagram of one embodiment of the intelligent label with a cutaway to show the radio frequency transponder, the global positioning system, and other associated components.

The Global Positioning System (GPS) is a constellation of twenty-four satellites that orbit the earth twice a day, transmitting precise time and positioning information to anywhere on the globe, twenty-four hours a day. The system was designed and deployed by the U.S. Department of Defense to provide continuous, worldwide position and navigation data for the use of the United States and allied military forces. The potential for commercial applications of GPS were recognized early in the system's development and a determination made to allow free access to GPS signals with certain constraints applied.

Each GPS satellite broadcasts two signals, PPS (Precise Positioning Service) and SPS (Standard Positioning Service). The PPS signal is a military-access code. The SPS is an unencrypted, spread-spectrum signal broadcast at 1,575.42 MHz. Unlike signals from Land-base navigation systems, GPS signals are virtually resistant to multi-path and nighttime interference, and are unaffected by weather and electrical noise.

GPS receivers listen to signals from either three or four satellites at a time and triangulate a position fix using the interval between the transmission and reception of the satellite signal. Any particular receiver tracks more satellites than are actually needed for a position fix. The reason for this is that if one satellite becomes unavailable, the receiver knows exactly where to find the best possible replacement. Three satellites are required for two-dimension positioning (i.e. position only). Four satellites are required for three-dimension positioning (i.e. position and elevation). In general, an SPS receiver can provide position information with an error of less than twenty-five meters and velocity information with an error of less than five meters per second. A PPS receiver permits much greater accuracy.

Recently, PPS has been made available for civilian and commercial use. As such, users of GPS may find it desirable to use the more accurate PPS instead of SPS. In addition to the GPS, the Russian Republic operates a satellite based positioning system of its own. Recently, the European Union and its associated organizations have undertaken an effort to create an independent satellite based positioning system equivalent to the U.S. GPS. Therefore, any further references to global positioning systems in this application shall be in reference to any present or future system which relies on signals from satellites to determine its position.

A magnetic field sensing systems can be used to determine and/or sense direction, heading, proximity orientation, position, movement, etc. One general example of a magnetic field sensor that can be used in the present invention is the HMC/HMR Series sensors from Honeywell, a specific example being the HMC 1051 and HMC 1052 Honeywell sensors. An exemplary size of these sensors would be 3×3×1 millimeters, but sensors smaller than this or larger than this can be also used to practice some of the embodiments of the present invention. Many of these sensors are high performance magnetoresistive sensors located on a single chip, and provide single, double, triple, and multiple axis sensing capability combined with ultra small size and low power capability. These sensors are typically capable of sensing fields below 0.1 milligauss. Some embodiments of the present invention can utilize such sensors, while other embodiments of the present invention can utilize other sensors. By way of example and not by limitation, sensors capable of sensing fields above 0.1 milligauss can be used to practice the present invention. Any sensor capable of determining and/or sensing direction, heading, proximity orientation, position and/or movement based on a magnetic filed can be used to practice the present invention.

Some embodiments of the present invention can be practiced utilizing sensors that can sense the earth's magnetic field and use the earth's magnetic field to determine and/or sense direction, heading, proximity orientation, position and/or movement. Other embodiments of the present invention can be practiced utilizing sensors that can sense man-made ferrous objects emitting a magnetic field. Still other embodiments of the present invention can be practiced using sensors that sense naturally occurring local magnetic fields formed, by way of example, by concentrations of ferrous materials in the local terrain. Still other embodiments can be practiced utilizing sensors that can sense a plurality of the just mentioned magnetic fields. In some of the embodiments of the present invention, the sensed magnetic field is sensed to determine at least one of direction, heading, proximity, orientation, position and/or movement.

Some embodiments of the present invention also include a fingerprint sensor system. Fingerprint sensing and matching is a technique that can be used for personal identification or verification in the present invention. In particular, an approach to fingerprint identification usable in the present invention involves scanning a fingerprint, and recording and/or comparing information relating to the fingerprint to information regarding one or more fingerprints already in a database to determine proper identification of a person, such as for verification purposes.

A biometric identification device such as a fingerprint sensor can be utilized with the present invention to read a fingerprint. In an exemplary embodiment, fingerprint sensor model AES3550 or model AES 2500 marketed by AUTHENTEC, the latter model measuring about 14 mm×5 mm×1.3 mm, could be used to practice the invention. In another exemplary embodiment, a BIOCONTROLLER fingerprint sensor marketed by SMART BIOMETRICS, INC. of Longwood, Fla. can be used. In yet another embodiment, a FINGERCHIP thermal silicon chip fingerprint sensor, marketed by THOMSON-CSF, of Saint-Egreve, France, or the equivalent, could be used. It is noted that in some embodiments of the present invention, it is desirable that the fingerprint sensor be small.

In some embodiments of the present invention, a fingerprint sensor including an anisotrophic dielectric coating can be used. An example of such a sensor is disclosed in U.S. Pat. No. 6,088,471, the contents of which are incorporated by reference in its entirety. Other embodiments of the present invention can utilize the fingerprint sensor technologies of U.S. Pat. Nos. 6,088,585, 6,512,381, 6,128,399, and 5,844,287, the contents of which are incorporated by reference in their entirety.

In some embodiments of the present invention, a fingerprint sensing system that operates by illuminating a finger surface using visible light, infrared light, or ultrasonic radiation can be used. In these embodiments, the reflected energy can be captured with some form of camera, for example, and the resulting image is framed, digitized and stored as a static digital image.

In other embodiments of the present invention, a fingerprint sensing system that utilizes an array of extremely small capacitors located in a plane parallel to a sensing surface can be used. When a finger touches the sensing surface and deforms the surface, a voltage distribution in a series connection of the capacitors may change. The voltages on each of the capacitors can be determined by multiplexor techniques. In other embodiments of the invention, the fingerprint sensor system can use electrodes to scan a fingerprint. Still further, fingerprint sensor systems utilizing any other type of sensor and method of sensing a fingerprint can be used to practice the invention, providing that the fingerprint sensor system can be combined with the RFID and label technologies disclosed herein.

One embodiment of the present invention utilizes the Global Positioning System and is shown in FIG. 1 in the context of an intelligent label 2, comprising a substrate 4 with a radio frequency transponder 6 coupled by wiring 7 or other conductive material to a global positioning system 8. As can be seen from FIG. 1, the intelligent label 2 can be rectangular in shape, and dimensioned, in an embodiment, to slide into a standard 4.125 inch by 9.5 inch standard U.S. mail envelope without being folded. However, the shape of the label is not restricted to a rectangular shape and the dimensions are not restricted to these dimensions. For example, an embodiment would include a label the size of a typical credit card, a post card, a postage stamp, or the size of a side of a large cardboard box. The exact dimensions of the desired embodiments would be driven by factors including but not limited to economic factors and application factors important to the end user.

The intelligent label of one embodiment would include a surface to permit the printing or writing of information on the label, such as a name, shipping destination, package contents, or a bar code. Alternatively, an embodiment is envisioned whereby the label is purposely designed to be devoid of all markings, the intention of the designer to make the label blend with the surface to which it is attached. In yet another alternative, the label is transparent or semi-transparent, allowing all or part of the surface under the label to be visible through the label.

The substrate 4 could be fabricated utilizing standard material or any other material used to make labels. Additionally, it is envisioned that the substrate 4 could be made from plastic, including polyester material, paper, synthetic paper, reinforced cardboard, synthetic paper coated cardboard, metal, or any other appropriate substance. It is noted that in some embodiments of the present invention, the substrate is flexible, while in other embodiments the substrate is rigid. It is also envisioned that the substrate 4 could be the wall or walls of a shipping box, a side or sides of an envelope, or even package wrapping. It could also be pressure sensitive label stock with a liner and an adhesive bearing face. It could also be a pressure sensitive tag stock with just two liners. It could also be a rigid film with a liner. It could also be a sheet of paper, an identification badge, or any other thin object.

The substrate 4 would optionally include an adhesive layer to facilitate attachment of the label to an object, or could be provided with other attachment means, such as clips or bolt holes. The adhesive layer could optionally be placed on the tag at the manufacturing site or plated on the substrate just before attachment of the label to an object, or any place or time in between. Also, it is envisioned that the object receiving the tag could have the adhesive or other attachment means, so that it is not necessary to provide an attachment means on the label.

The radio frequency transponder and the global positioning system are embedded into the substrate or coupled to the substrate and preferably do not exceed the outer boundaries of the substrate. In one embodiment, portions of the radio frequency transponder and the global positioning system are printed, while other portions are incorporated by other means. For example, antennas and wiring are prime candidates for printing, while it may be desired to attach the integrated circuits or portions of the integrated circuits separately because extremely tiny and thin circuit chips can be produced in high volume using automated techniques. In yet a third embodiment the radio frequency transponder and the global positioning system are manufactured as self contained units and are attached to the substrate in a separate manufacturing operation. Another embodiment includes a combined transponder and global positioning system manufactured as a self contained radio frequency transponder and global positioning system unit and attached to the substrate in a separate manufacturing operation. In a further embodiment, the substrate is die cut in such a way so that the substrate can serve as an antenna. U.S. Pat. Nos. 6,107,920 and 6,280,544 provide examples of radio frequency transponders in combination with substrates and are incorporated by reference herein in their entirety.

Figure 2:
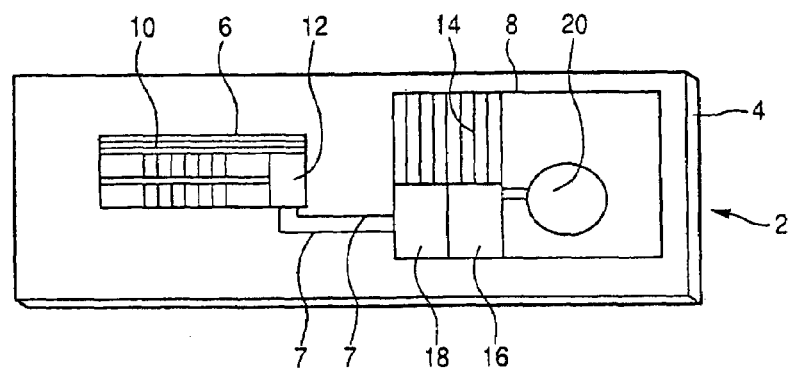
FIG. 2 is an unobstructed top view of the embodiment shown in FIG. 1.

FIG. 2 shows an unobstructed view of the intelligent label 2 with the radio frequency transponder 6. The transponder comprises an antenna 10 and an integrated circuit chip 12. If desired, a power source (not shown), such as a thin battery or a solar panel can be linked to the transponder to improve the transmission range of the transponder. The thin battery can be in the form of a printed battery such as one manufactured utilizing Texas Instrument's flexographic printed battery process. Additionally, the transponder could further include a memory for storing data. This memory could be in the form of a commercially available memory chip. An exemplary radio frequency transponder is the subject of U.S. Pat. No. 5,574,470, and is incorporated by reference herein in its entirety. An alternate exemplary radio frequency transmitter is the subject of U.S. Pat. No. 5,942,977 and is also incorporated by reference herein in its entirety. Yet another alternate exemplary radio frequency transmitter is the Motorola BiStatix inductive transmitter. However, the form of the transponder is not limited to these examples or similar examples. Likewise, the type of transponder is not limited to the specific embodiments described in the examples. It is envisioned that the transponder should be selected based on the needs of the end user. Such needs include signal range, speed of data transmittal, amount of data transmittal, frequency of data transmittal, or any special signal frequency or signal amplitude requirements.

FIG. 2 further shows the global positioning system 8 attached to the substrate 4, along with the wire coupling 7 to the transponder 6. The global positioning system 8 comprises an antenna 14, a receiver 16 and a processor 18. Also, a power source 20 is wired to the global positioning system 8. The power source can be a thin battery or a solar panel or any other power source which is compact enough to satisfy the end user's requirements. The thin battery can be in the form of a printed battery such as one manufactured utilizing Texas Instrument's flexographic printed battery process. The power source can be a shared power source between the transponder and the global positioning system. Additionally, the global positioning system would include a memory for storing data. This memory could be in the form of a commercially available memory chip. The type of global positioning system should be selected to be as compact and thin as possible. Also, the global positioning system should be designed to consume minimal power. For example, an advanced processor may not be necessary. A slower processor which consumes less power with low voltage logic circuits will satisfy the requirements of most users.

Figure 3:
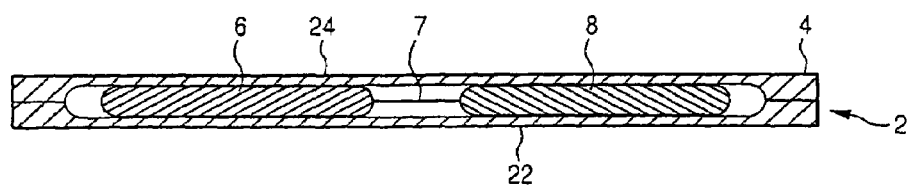
FIG. 3 is a side view of the embodiment shown in FIG. 1.

FIG. 3 shows an enlarged side view of one embodiment of the present invention. Here, the radio frequency transponder 6, again coupled by wiring 7 or other conductive material to a global positioning system 8, is embedded in the substrate 4 to form the intelligent label 2. In this embodiment, an adhesive can be applied to the back side 22 of the label in an amount suitable to secure the label to a package or other item, and printing is applied to the front side 24 of the label to provide a visual means of identifying the label. In another embodiment, it is envisioned that a filler layer is provided to keep the thickness of the label as uniform as possible. By way of example and not by limitation, a square filler sheet is obtained which has a cutout in the center large enough to contain the radio frequency transponder coupled to the global positioning system. This cutout preferably has the same thickness as the thickest portion of the radio frequency transponder and the global positioning system.

Figure 4:
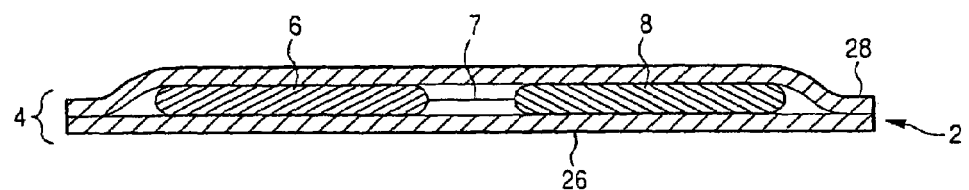
FIG. 4 is a side view of another embodiment of the present invention.

FIG. 4 shows an enlarged side view of another embodiment of the present invention. Here, the radio frequency transponder 6, again coupled by wiring 7 or other conductive material to a global positioning system 8, is embedded between a liner 26 and face stock 28, collectively making up the substrate 4, to form the intelligent label 2. In this embodiment, it is expected that adhesive be applied to either liner 26 or face stock 28 or both to so that liner 26 and face stock 28 remain secured to each other, thus securing the radio frequency transponder 6 and the global positioning system 8 inside the label. Again, it is envisioned that a filler layer can be provided to keep the thickness of the label as uniform as possible. In this embodiment, an adhesive can be applied to the back side of the label in an amount suitable to secure the label to a package or other item.

It is envisioned that many of the components of the radio frequency transponder and the global positioning system can be shared between the two components. For example, if a power source is required for the transponder, it may be appropriate to utilize the same power source that is used to power the global positioning system. Another example would be sharing the same antenna between the two components. Yet another example would be sharing the same memory between the two components. In embodiments where the components are shared, it is envisioned that a switching unit may be advantageous or even necessary. By way of example and not by limitation, in the case of a shared power source, it may not be necessary to continuously power both the transponder and the global positioning system. In such circumstances, power could be switched from one component to the other depending on which component was needed. Additionally, shared components may be segmented so that one portion supports the radio frequency transponder, while another portion supports the global positioning system. It is also envisioned that a specialized user could desire a more complicated intelligent label. For example, it is envisioned that a miniaturized computer could be attached to either the global positioning system or the radio frequency transponder, the entire system being attached to a substrate.

A variety of methods may be used to manufacture the intelligent label of the present invention. For example, in making the intelligent label, a method is envisioned whereby substrate comprising a pressure sensitive stock and a liner is unwound. In some embodiments of the present invention, the substrate is unrolled from a roll of substrate prior to attaching said radio frequency transponder and said global positioning system to said substrate. Thus, in some embodiments of the invention, the substrate is unrolled substrate stock. At this point in the process, the user can print on the substrate if desired. Next, the substrate is delaminated by peeling off the top layer (i.e., the liner) to expose an adhesive on a lower layer (i.e., the pressure sensitive stock). The peeled-off top layer is carried through the manufacturing process and eventually, as described below, is rejoined with the lower layer.

While the substrate is being unrolled and delaminated, a continuous web containing radio frequency transponders and global positioning systems is unrolled and die cut into separate transponder/global positioning system units. The individual radio frequency transponder/global positioning system units are then transferred to the adhesive exposed on the lower layer. At this point, a hot melt adhesive may be applied to the top side of the lower layer covering the radio frequency transponder and global positioning system units positioned thereon, if required.

After the radio frequency transponder and global positioning system units are applied to the lower layer (and after a hot melt adhesive layer is applied, if required), the top layer is relaminated onto the lower layer thereby covering the radio frequency transponder and global positioning system units attached thereto. Finally, the substrate (comprising both the top layer, lower layer, and radio frequency transponder and global positioning system units) is die cut into sheets, each of which contains a radio frequency transponder coupled to a global positioning system.

A second method is envisioned of making an intelligent label. In this method, a substrate comprising a pressure sensitive stock and a liner is unwound. At this point in the process, the user may print on the substrate, if required. Following the printing process, the substrate is delaminated by peeling off the top layer (i.e., the liner) to expose a lower layer (i.e., the pressure sensitive stock). The lower layer is pattern (or flood) coated with a hot melt adhesive, while the peeled-off top layer is carried through the manufacturing process, to be eventually rejoined with the lower layer, as described below.

While the substrate is being unrolled and delaminated, a continuous web containing radio frequency transponder and global positioning system units is unrolled and die cut into separate units. Individual radio frequency transponder and global positioning system units are then transferred to the hot melt adhesive exposed on the lower layer. At this point, additional hot melt adhesive may be applied to the top side of the lower layer thereby covering the radio frequency transponder and global positioning system units placed thereon, if required.

After the radio frequency transponder and global positioning system units are applied to the lower layer (and after an additional hot melt adhesive layer is applied, if required), the top layer is relaminated onto the lower layer thereby covering the radio frequency transponder and global positioning system units attached thereto. Finally, the substrate (comprising both the top layer, lower layer, and radio frequency transponder and global positioning system units) is die cut into sheets each of which contains a radio frequency transponder and global positioning system units.

Figure 5:
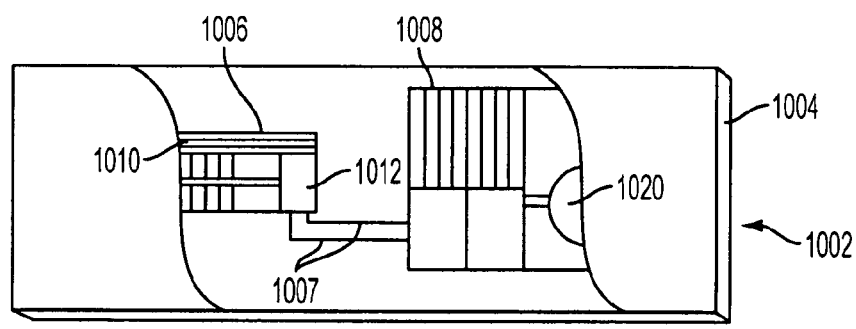
FIG. 5 is a schematic diagram of one embodiment of the intelligent label with a cutaway to show the radio frequency transponder, the magnetic field sensing system, and other associated components.

Another embodiment of the present invention utilizes a magnetic field sensing system and is shown in FIG. 5 in the context of an intelligent label 1002, comprising a substrate 1004 with a radio frequency transponder 1006 coupled by wiring 1007 or other conductive material to a magnetic field sensing system 1008, which in some embodiments includes a processor. As can be seen from FIG. 5, the intelligent label 1002 can be rectangular in shape, and dimensioned, in an embodiment, to slide into a standard 4.125 inch by 9.5 inch standard U.S. mail envelope without being folded. However, the shape of the label is not restricted to a rectangular shape and the dimensions are not restricted to these dimensions. For example, an embodiment would include a label the size of a typical credit card, a post card, a postage stamp, or the size of a side of a large cardboard box. The exact dimensions of the desired embodiments would be driven by factors including but not limited to economic factors and application factors important to the end user.

The intelligent label of one embodiment would include a surface to permit the printing or writing of information on the label, such as a name, shipping destination, package contents, or a bar code. Alternatively, an embodiment is envisioned whereby the label is purposely designed to be devoid of all markings, the intention of the designer to make the label blend with the surface to which it is attached. In yet another alternative, the label is transparent or semi-transparent, allowing all or part of the surface under the label to be visible through the label.

The substrate 1004 could be fabricated utilizing standard material or any other material used to make labels. Additionally, it is envisioned that the substrate 1004 could be made from plastic, including polyester material, paper, synthetic paper, reinforced cardboard, synthetic paper coated cardboard, metal, or any other appropriate substance. It is noted that in some embodiments of the present invention, the substrate is flexible, while in other embodiments the substrate is rigid. It is also envisioned that the substrate 1004 could be the wall or walls of a shipping box, a side or sides of an envelope, or even package wrapping. It could also be pressure sensitive label stock with a liner and an adhesive bearing face. It could also be a pressure sensitive tag stock with just two liners. It could also be a rigid film with a liner. It could also be a sheet of paper, an identification badge, or any other thin object.

The substrate 1004 would optionally include an adhesive layer to facilitate attachment of the label to an object, or could be provided with other attachment means, such as clips or bolt holes. The adhesive layer could optionally be placed on the tag at the manufacturing site or placed on the substrate just before attachment of the label to an object, or any place or time in between. Also, it is envisioned that the object receiving the tag could have the adhesive or other attachment means, so that it is not necessary to provide an attachment means on the label.

The radio frequency transponder and the magnetic field sensing system are embedded into the substrate or coupled to the substrate and preferably do not exceed the outer boundaries of the substrate. In one embodiment, portions of the radio frequency transponder and the magnetic field sensing system are printed, while other portions are incorporated in other manners. For example, antennas and wiring are prime candidates for printing, while it may be desired to attach the integrated circuits or portions of the integrated circuits separately because extremely tiny and thin circuit chips can be produced in high volume using automated techniques. In yet another embodiment, the radio frequency transponder and the magnetic field sensing system are manufactured as self contained units and are attached to the substrate in a separate manufacturing operation. Another embodiment includes a combined transponder and magnetic field sensing system manufactured as a self contained radio frequency transponder and magnetic field sensing system unit and attached to the substrate in a separate manufacturing operation. In a further embodiment, the substrate is die cut in such a way so that the substrate can serve as an antenna. U.S. Pat. Nos. 6,107,920 and 6,280,544 provide examples of radio frequency transponders in combination with substrates and are incorporated by reference herein in their entirety.

Figure 6:
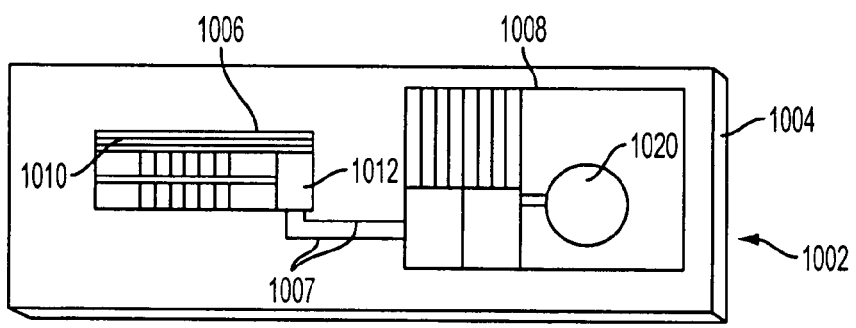
FIG. 6 is an unobstructed top view of the embodiment shown in FIG. 5.

FIG. 6 shows an unobstructed view of the intelligent label 1002 with the radio frequency transponder 1006. The transponder comprises an antenna 1010 and an integrated circuit chip 1012. If desired, a power source (not shown), such as a thin battery or a solar panel can be linked to the transponder to improve the transmission range of the transponder. The thin battery can be in the form of a printed battery such as one manufactured utilizing Texas Instrument's flexographic printed battery process. Additionally, the transponder could further include a memory for storing data. This memory could be in the form of a commercially available memory chip. An exemplary radio frequency transponder is the subject of U.S. Pat. No. 5,574,470, and is incorporated by reference herein in its entirety. An alternate exemplary radio frequency transmitter is the subject of U.S. Pat. No. 5,942,977 and is also incorporated by reference herein in its entirety. Yet another alternate exemplary radio frequency transmitter is the Motorola BiStatix inductive transmitter. However, the form of the transponder is not limited to these examples or similar examples. Likewise, the type of transponder is not limited to the specific embodiments described in the examples. It is envisioned that the transponder should be selected based on the needs of the end user. Such needs might include, for example, signal range, speed of data transmittal, amount of data transmittal, frequency of data transmittal, or any special signal frequency or signal amplitude requirements.

FIG. 6 further shows the magnetic field sensing system 1008 attached to the substrate 1004, along with the wire coupling 1007 to the transponder 1006. A power source 1020 is wired to the magnetic field sensing system 1008. The power source can be a thin battery or a solar panel or any other power source which is compact enough to satisfy the end user's requirements. The thin battery can be in the form of a printed battery such as one manufactured utilizing Texas Instrument's flexographic printed battery process. The power source can be a shared power source between the transponder and the magnetic field sensing system. Additionally, the magnetic field sensing system could include a memory for storing data. This memory could be in the form of a commercially available memory chip. The type of magnetic field sensing system should be selected to be as compact and thin as possible. Also, the magnetic field sensing system should be designed to consume minimal power. For example, an advanced processor may not be necessary. A slower processor which consumes less power with low voltage logic circuits will satisfy the requirements of most users.

Figure 7:
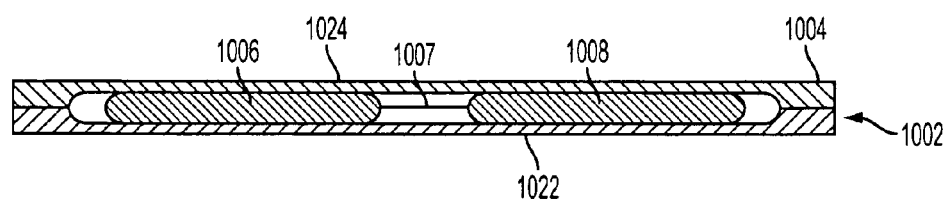
FIG. 7 is a side view of the embodiment shown in FIG. 5.

FIG. 7 shows an enlarged side view of an embodiment of the present invention. Here, the radio frequency transponder 1006, again coupled by wiring 1007 or other conductive material to a magnetic field sensing system 1008, is embedded in the substrate 1004 to form the intelligent label 1002. In this embodiment, an adhesive can be applied to the back side 1022 of the label in an amount suitable to secure the label to a package or other item, and printing is applied to the front side 1024 of the label to provide a visual means of identifying the label. In another embodiment, it is envisioned that a filler layer is provided to keep the thickness of the label as uniform as possible. By way of example and not by limitation, a square filler sheet is obtained which has a cutout in the center large enough to contain the radio frequency transponder coupled to the magnetic field sensing system. This cutout preferably has the same thickness as the thickest portion of the radio frequency transponder and the magnetic field detecting system.

Figure 8:
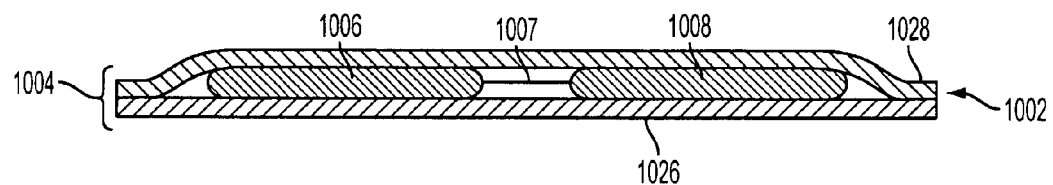
FIG. 8 is a side view of another embodiment of the present invention.

FIG. 8 shows an enlarged side view of another embodiment of the present invention. Here, the radio frequency transponder 1006, again coupled by wiring 1007 or other conductive material to a magnetic field sensing system 1008, is embedded between a liner 1026 and face stock 1028, collectively making up the substrate 1004, to form the intelligent label 2. In this embodiment, it is expected that adhesive be applied to either liner 1026 or face stock 1028 or both to so that liner 1026 and face stock 1028 remain secured to each other, thus securing the radio frequency transponder 1006 and the magnetic field sensing system 1008 inside the label. Again, some embodiments of the invention can utilize a filler layer to keep the thickness of the label as uniform as possible. In this embodiment, an adhesive can be applied to the back side of the label in an amount suitable to secure the label to a package or other item.

In some embodiments of the present invention, many of the components of the radio frequency transponder and the magnetic field sensing system can be shared between the two components. For example, if a power source is required for the transponder, it may be appropriate to utilize the same power source that is used to power the magnetic field sensing system. Yet another example would be sharing the same memory between the two components. In embodiments where the components are shared, it is envisioned that a switching unit may be advantageous or even necessary. By way of example and not by limitation, in the case of a shared power source, it may not be necessary to continuously power both the transponder and the magnetic field sensing system. In such circumstances, power could be switched from one component to the other depending on which component was needed. Additionally, shared components may be segmented so that one portion supports the radio frequency transponder, while another portion supports the magnetic field sensing system. It is also envisioned that a specialized user could desire a more complicated intelligent label. For example, it is envisioned that a miniaturized computer could be attached to either the magnetic field sensing system or the radio frequency transponder, the entire system being attached to a substrate.

A variety of methods may be used to manufacture the intelligent label utilizing the magnetic field sensor of the present invention, including the above referenced methods for making the intelligent label using the global positioning system, where the global positioning system is replaced by the magnetic field sensing system (i.e. in the above discussed methods, the words "global positioning system" are replaced with the words "magnetic field sensing system"). Thus, in the interests of linguistic economy, the above discussed manufacturing methods will not be repeated, but instead are referred to and incorporated here by reference. Still further, the above methods would be applicable to manufacturing an intelligent label having both a GPS and a magnetic field sensing system.

Figure 9:
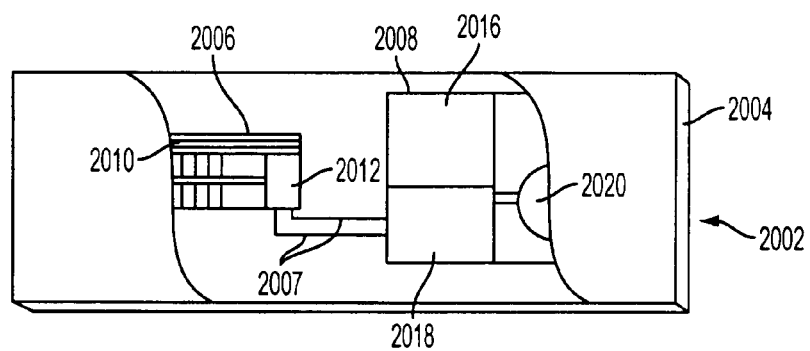
FIG. 9 is a schematic diagram of one embodiment of the intelligent label with a cutaway to show the radio frequency transponder, the fingerprint sensor system, and other associated components.

Another embodiment of the present invention utilizes a fingerprint sensing system and is shown in FIG. 9 in the context of an intelligent label 2002, comprising a substrate 2004 with a radio frequency transponder 2006 coupled by wiring 2007 or other conductive material to a fingerprint sensor system 2008. As can be seen from FIG. 9, the intelligent label 2002 can be rectangular in shape, and dimensioned, in an embodiment, to slide into a standard 4.125 inch by 9.5 inch standard U.S. mail envelope without being folded. However, the shape of the label is not restricted to a rectangular shape and the dimensions are not restricted to these dimensions. For example, an embodiment would include a label the size of a typical credit card, a post card, a postage stamp, or the size of a side of a large cardboard box. The exact dimensions of the desired embodiments would be driven by factors including but not limited to economic factors and application factors important to the end user.

The intelligent label of one embodiment would include a surface to permit the printing or writing of information on the label, such as a name, shipping destination, package contents, or a bar code. Alternatively, an embodiment is envisioned whereby the label is purposely designed to be devoid of all markings, the intention of the designer to make the label blend with the surface to which it is attached. In yet another alternative, the label is transparent or semi-transparent, allowing all or part of the surface under the label to be visible through the label.

The substrate 2004 could be fabricated utilizing standard material or any other material used to make labels. Additionally, it is envisioned that the substrate 2004 could be made from plastic, including polyester material, paper, synthetic paper, reinforced cardboard, synthetic paper coated cardboard, metal, or any other appropriate substance. It is noted that in some embodiments of the present invention, the substrate is flexible, while in other embodiments the substrate is rigid. It is also envisioned that the substrate 2004 could be the wall or walls of a shipping box, a side or sides of an envelope, or even package wrapping. It could also be pressure sensitive label stock with a liner and an adhesive bearing face. It could also be a pressure sensitive tag stock with just two liners. It could also be a rigid film with a liner. It could also be a sheet of paper, an identification badge, or any other thin object.

The substrate 2004 would optionally include an adhesive layer to facilitate attachment of the label to an object, or could be provided with other attachment means, such as clips or bolt holes. The adhesive layer could optionally be placed on the tag at the manufacturing site or plated on the substrate just before attachment of the label to an object, or any place or time in between. Also, it is envisioned that the object receiving the tag could have the adhesive or other attachment means, so that it is not necessary to provide an attachment means on the label.

In one embodiment, the radio frequency transponder is embedded into the substrate or coupled to the substrate and preferably does not exceed the outer boundaries of the substrate. Portions of the fingerprint sensing system likewise can be imbedded in the substrate, as long as the portion that "sees" the fingerprint is exposed. However, in other embodiments of the present invention, the entire fingerprint sensor is also embedded in the substrate, but in a manner that still permits the fingerprint sensor to sense the fingerprint in an acceptable manner. In one embodiment, portions of the radio frequency transponder and the fingerprint sensing system are printed, while other portions are incorporated in other manners. For example, antennas and wiring are prime candidates for printing, while it may be desired to attach the integrated circuits or portions of the integrated circuits separately because extremely tiny and thin circuit chips can be produced in high volume using automated techniques. In yet a third embodiment, the radio frequency transponder and the fingerprint sensing system are manufactured as self contained units and are attached to the substrate in a separate manufacturing operation. Another embodiment includes a combined transponder and fingerprint sensing system manufactured as a self contained radio frequency transponder and fingerprint sensing system unit and attached to the substrate in a separate manufacturing operation. In a further embodiment, the substrate is die cut in such a way so that the substrate can serve as an antenna. U.S. Pat. Nos. 6,107,920 and 6,280,544 provide examples of radio frequency transponders in combination with substrates and are incorporated by reference herein in their entirety.

Figure 10:
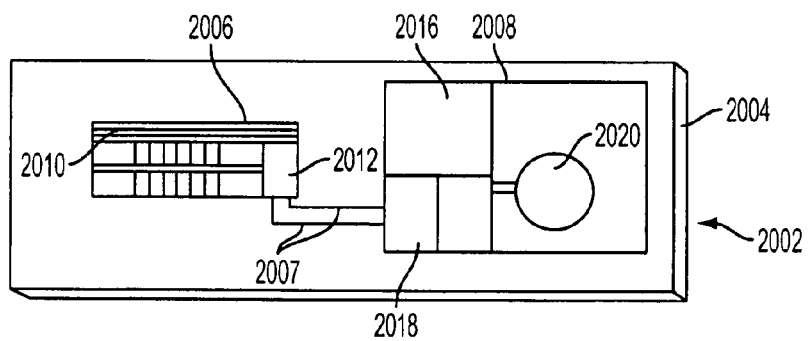
FIG. 10 is an unobstructed top view of the embodiment shown in FIG. 9.

FIG. 10 shows an unobstructed view of the intelligent label 2002 with the radio frequency transponder 2006. The transponder comprises an antenna 2010 and an integrated circuit chip 2012. If desired, a power source (not shown), such as a thin battery or a solar panel can be linked to the transponder to improve the transmission range of the transponder. The thin battery can be in the form of a printed battery such as one manufactured utilizing Texas Instrument's flexographic printed battery process. Additionally, the transponder could further include a memory for storing data. This memory could be in the form of a commercially available memory chip. An exemplary radio frequency transponder is the subject of U.S. Pat. No. 5,574,470, and is incorporated by reference herein in its entirety. An alternate exemplary radio frequency transmitter is the subject of U.S. Pat. No. 5,942,977 and is also incorporated by reference herein in its entirety. Yet another alternate exemplary radio frequency transmitter is the Motorola BiStatix inductive transmitter. However, the form of the transponder is not limited to these examples or similar examples. Likewise, the type of transponder is not limited to the specific embodiments described in the examples. It is envisioned that the transponder should be selected based on the needs of the end user. Such needs include signal range, speed of data transmittal, amount of data transmittal, frequency of data transmittal, or any special signal frequency or signal amplitude requirements.

FIG. 10 further shows the fingerprint sensing system 2008 with sensor 2016 and processor 2018 attached to the substrate 2004, along with the wire coupling 2007 to the transponder 2006. A power source 2020 is wired to the fingerprint sensor system 2008. The power source can be a thin battery or a solar panel or any other power source which is compact enough to satisfy the end user's requirements. The thin battery can be in the form of a printed battery such as one manufactured utilizing Texas Instrument's flexographic printed battery process. The power source can be a shared power source between the transponder and the fingerprint sensing system. Additionally, the fingerprint sensing system could include a memory for storing data. This memory could be in the form of a commercially available memory chip. The type of finger print sensing system should be selected to be as compact and thin as possible. Also, the finger print sensing system should be designed to consume minimal power. For example, an advanced processor may not be necessary. A slower processor which consumes less power with low voltage logic circuits will satisfy the requirements of most users.

Figure 11:
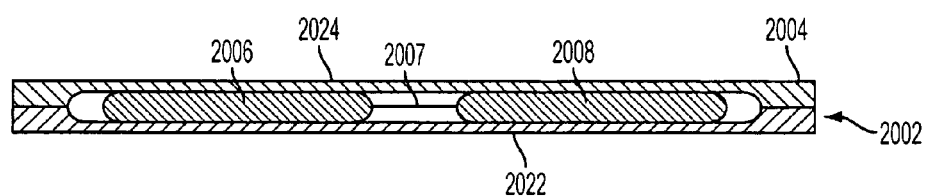
FIG. 11 is a side view of the embodiment shown in FIG. 9.

FIG. 11 shows an enlarged side view of one embodiment of the present invention. Here, the radio frequency transponder 2006, again coupled by wiring 2007 or other conductive material to a fingerprint sensing system 2008, is embedded in the substrate 2004 to form the intelligent label 2002. In this embodiment, an adhesive can be applied to the back side 2022 of the label in an amount suitable to secure the label to a package or other item, and printing is applied to the front side 2024 of the label to provide a visual means of identifying the label. In another embodiment, it is envisioned that a filler layer is provided to keep the thickness of the label as uniform as possible. By way of example and not by limitation, a square filler sheet is obtained which has a cutout in the center large enough to contain the radio frequency transponder coupled to the fingerprint sensing system. This cutout preferably has the same thickness as the thickest portion of the radio frequency transponder and the fingerprint sensing system. It is noted that in some embodiments of the invention, the fingerprint sensor system is entirely embedded in the substrate 2004. However, in other embodiments of the present invention, only a portion of the fingerprint sensor is embedded in the substrate. These latter embodiments would be practiced, by way of example and not by limitation, in the case where the sensor of the fingerprint sensor system either requires or has enhanced performance when there is nothing between the sensor and the fingerprint being read. This embodiment could be practiced, for example, by cutting a hole in a portion of the substrate to provide direct access to the sensor.

Figure 12:
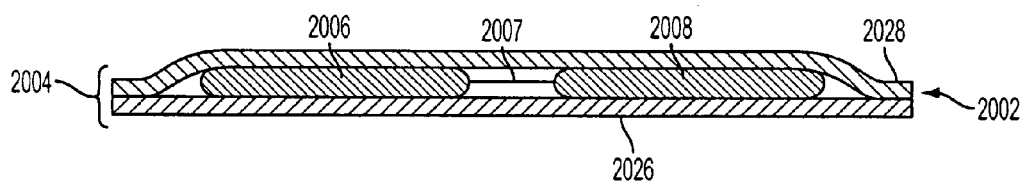
FIG. 12 is a side view of another embodiment of the present invention.

FIG. 12 shows an enlarged side view of another embodiment of the present invention. Here, the radio frequency transponder 2006, again coupled by wiring 2007 or other conductive material to fingerprint sensing system 2008, is embedded between a liner 2026 and face stock 2028, collectively making up the substrate 2004, to form the intelligent label 2. In this embodiment, it is expected that adhesive be applied to either liner 2026 or face stock 2028 or both to so that liner 2026 and face stock 2028 remain secured to each other, thus securing the radio frequency transponder 2006 and the fingerprint sensing system 2008 inside the label. Again, some embodiments of the invention can utilize a filler layer to keep the thickness of the label as uniform as possible. In this embodiment, an adhesive can be applied to the back side of the label in an amount suitable to secure the label to a package or other item. Still further, some exemplary embodiments can have a hole cut into either or both of the liner 2026 and the face stock 2028 to provide direct access to the sensor of the fingerprint sensor system.

In some embodiments of the present invention, many of the components of the radio frequency transponder and the fingerprint sensing system can be shared between the two components. For example, if a power source is required for the transponder, it may be appropriate to utilize the same power source that is used to power the fingerprint sensing system. Yet another example would be sharing the same memory between the two components. In embodiments where the components are shared, it is envisioned that a switching unit may be advantageous or even necessary. By way of example and not by limitation, in the case of a shared power source, it may not be necessary to continuously power both the transponder and the fingerprint sensing system. In such circumstances, power could be switched from one component to the other depending on which component was needed. Additionally, shared components may be segmented so that one portion supports the radio frequency transponder, while another portion supports the fingerprint sensing system. It is also envisioned that a specialized user could desire a more complicated intelligent label. For example, it is envisioned that a miniaturized computer could be attached to either the fingerprint sensing system or the radio frequency transponder, the entire system being attached to a substrate.

In some embodiments of the present invention, the power source connected to said radio frequency transponder and a separate power source connected to the fingerprint sensor system and/or the magnetic field sensing system and/or the global positioning system. In other embodiments of the invention, the radio frequency transponder and said the fingerprint sensor system and/or the magnetic field sensing system and/or the global positioning system are powered by radio waves received by the transponder.

A variety of methods may be used to manufacture the intelligent label utilizing the fingerprint sensing system of the present invention, including the above referenced methods for making the intelligent label using the global positioning system, where the global positioning system is replaced by the fingerprint sensing system (i.e. in the above discussed methods, the words "global positioning system" are replaced with the words "fingerprint sensing system"). Thus, in the interests of linguistic economy, the above discussed manufacturing methods will not be repeated, but instead are referred to and incorporated here by reference. Still further, the above methods would be applicable to manufacturing an intelligent label having a GPS and/or a magnetic field sensing system and/or a fingerprint sensor system.

In some embodiments of the present invention, there is a method of making an intelligent label, comprising the steps of obtaining a substrate comprising a pressure sensitive face stock and a release liner; delaminating said substrate by peeling off said release liner to expose an adhesive on said pressure sensitive face stock obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor system and/or magnetic field sensing system and/or global positioning system, transferring a web cutting to the adhesive exposed on said pressure sensitive face stock of said substrate; and, relaminating said release liner onto said pressure sensitive face stock to cover a portion or all of said web cutting.

In another embodiment of the present invention, there is a method of making an intelligent label, comprising the steps of, obtaining a substrate comprising a pressure sensitive face stock and a release liner, delaminating said substrate by peeling off said release liner to expose said pressure sensitive face stock, pattern coating said pressure sensitive face stock with a hot melt adhesive, obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor system and/or magnetic field sensing system and/or global positioning system, transferring a web cutting to said pressure sensitive face stock of said substrate, and relaminating said release liner onto said pressure sensitive face stock to cover a portion or all of said web cutting.

In another embodiment of the present invention, there is a method of making an intelligent label, comprising the steps of obtaining a non-pressure sensitive substrate, obtaining a laminate, pattern coating said non-pressure sensitive substrate with an adhesive, obtaining a continuous web comprising radio frequency transponders coupled to fingerprint sensor systems and/or magnetic field sensing systems and/or global positioning systems, cutting said web to produce web cuttings, each web cutting comprising at least one radio frequency transponder coupled to at least one fingerprint sensor systems and/or magnetic field sensing systems and/or global positioning systems, transferring a web cutting to one of said laminate and said non-pressure sensitive substrate, and pressing said non-pressure sensitive substrate onto said laminate to cover said web cutting in the area around at least a portion of the fingerprint sensor system.

It is noted that some embodiments of the present invention can be practiced where an RFID system is combined with a GPS and/or a magnetic field sensing system and/or a fingerprint sensor system. Still further, other embodiments of the present invention can be practiced that include the methods of utilizing any or all of the embodiments of the present invention to track an object, verify access to an object, record access to an object, locate an object, and/or identify an object.

In practicing the above method of tracking or identifying an object, one scenario would include placing an intelligent label in or on a package that is later placed in the mail. As the package is transported, the global positioning system receives the signals from the requisite GPS satellites and processes those signals into location data. The data is then either transmitted directly to an interrogation station by the radio frequency transponder, or stored periodically in the memory of the global positioning. The memory serves to allow all or part of the previous location data to be stored for transmittal to an interrogator at a later date, such as in the instance when there is no interrogator available at the time the global positioning system takes its location readings. In this case, once the package is in range of the interrogator, it can upload the location data or any other data to the interrogator. Additionally, it is foreseen that the intelligent label will be used to facilitate changes in the routing of the package as it travels from its point of origin to is destination (or changed destination).

In another scenario, public attractions where the potential for lost or abducted children is a concern could use the intelligent label of the present invention as an emergency person locator. For example, a child could be given an intelligent label with his or her name written on the label. The label could be provided with an adhesive on one side so that it will stick to the child's shirt, or it could be provided on a wrist band. Alternatively, the label could simply be placed in the child's pants pocket, thus eliminating the need for adhesive. Interrogator stations would be arrayed in a manner so that they would be in communication with the label. If the location data provided to the interrogator comprised coordinates located outside of a desired area, an alarm would be tripped. Alternatively, a program could be created whereby the location data was automatically analyzed to detect unusual movement patterns. In any of these cases, location data could be immediately routed to parental, security, or law enforcement personnel to aid in the location of the missing child.

In another scenario, a golf course could offer its customers certain data relating to a golfer's game, utilizing the location (including elevation) of the golfer with respect to the targeted hole. The golfer could be provided with an intelligent label with his or her identification written on the label at the beginning of the game. The golfer could then initiate a data transmission at each stroke. A subsequent software application could use a mapping function to provide the golfer with a stroke-by-stroke analysis of his or her game.

In another scenario, a homeowner could affix intelligent labels to the underside of valuables, or insert the intelligent labels inside the valuables. An interrogator could routinely scan for the location of the valuables. If the data received from the tags attached to the valuables demonstrated any movement of the valuables during specified times, or movement of the valuables to a location outside a specified area, an alarm would be triggered and law enforcement would be directed to the known location, or last known location, of the valuables.

In yet another scenario, intelligent labels could be provided to persons who's movements are intended to be restricted or monitored. For example, employees who must move from work site to work site, can be given intelligent labels. At the end of each shift, the worker can be required to scan the label, thus causing information on all of the employee's movements during the day to be uploaded to a central computer for analysis. Alternatively, persons under house arrest, probation, or work release can likewise be monitored. Alternatively, persons granted visas for stay in a given country can likewise be monitored.

In yet another scenario, intelligent labels could be provided to cattle or other types of livestock or even wild animals. In such an example, the intelligent labels could be used to determine whether or not cattle has been exposed to other cattle that have tested positive for diseases such as mad cow disease.

Numerous additional scenarios can be provided, and the utility of the present invention is not limited to the scenarios just described.

In practicing the above method of tracking or identifying an object, another scenario could include placing an intelligent label in or on a package that is later placed in the mail. As the package is transported, a magnetic sensing system processes a sensed magnetic field of, for example, the earth, into location data or other forms of useful data. The data is then either transmitted directly to an interrogation station by the radio frequency transponder, or stored periodically in the memory of the label. The memory serves to allow all or part of the previous location data to be stored for transmittal to an interrogator at a later time. When the package is in range of the interrogator, it can upload the location data or any other data to the interrogator. Additionally, it is foreseen that the intelligent label will be used to facilitate changes in the routing of the package as it travels from its point of origin to is destination (or changed destination).

In another scenario, a golf course could offer its customers certain data relating to a golfer's game, utilizing the location (including elevation) of the golfer with respect to the targeted hole. The golfer could be provided with an intelligent label utilizing a magnetic field sensing system with his or her identification written on the label at the beginning of the game. The golfer could then initiate a data transmission at each stroke. A subsequent software application could use a mapping function to provide the golfer with a stroke-by-stroke analysis of his or her game. The magnetic field sensor could sense the magnetic field of the earth. In other embodiments, the magnetic field sensor could sense the magnetic field produced by ferrous objects buried underneath the golf course and/or positioned above the golf course and/or positioned along the golf course.

In yet another scenario, an intelligent label is placed in or on a part or product that is moved around a production or shipping or manufacturing location (e.g. plant). As the part/product is moved through the plant, the magnetic sensing system processes the sensed magnetic field of the earth or the magnetic field produced by ferrous objects located within the plant into location data or other forms of useful data. The data is then either transmitted directly to an interrogation station by the radio frequency transponder, or stored periodically in the memory of the intelligent label. The memory serves to allow all or part of the previous location data to be stored for transmittal to an interrogator at a later time, such as when there is no interrogator available at the time the magnetic field sensing system takes its location readings. In this case, once the part is in range of the interrogator, it can upload the location data or any other data to the interrogator. Additionally, it is foreseen that the intelligent label will be used to facilitate changes in the routing of the part as it travels through the plant. Still further by exemplary scenario, an intelligent label with a magnetic field sensor that stores a time based record of where and when the part was moved could be placed on a part located in a plant. The location of the part could be easily identified by RF interrogation. Still further, the information regarding the part's location could be read by the RF interrogators and the location data used for process improvement in the manufacturing operation to, for example, reduce queue times and identify queue locations.

It is noted that in some embodiments of the present invention, above discussed methods relating to the use of an intelligent label with a GPS can be practiced with an intelligent label with a magnetic sensing system, and visa-versa. Still further, the above scenarios, in other embodiments, could be practiced utilizing both a GPS and a magnetic sensing system.

Other scenarios utilizing the present invention include utilizing an RFID device with a fingerprint sensor to verify receipt of a package or other shipped good. For example, if verification is needed that a particular individual has received a package or letter, the individual could place one or more of his or her fingers in proximity to a fingerprint sensor located on an intelligent label, thus enabling the sensor to "read" his or her fingerprint and store information related to the fingerprint in a memory. This label could then be removed from the package and forwarded to a record processing location where an RF transponder relays package/label information including fingerprint information.

In yet other embodiments, the intelligent label could be pre-programmed with information regarding the fingerprint of the receiving party, and also provided with an indicator, such as by way of nonlimiting example, a LED, that indicates that the correct person is taking receipt of the package. This label could be quickly placed on a package and information about the expected fingerprint could be transferred from an RF station to the label, or alternatively, pre-programmed into the label. In other embodiments of the invention, the information could be transferred to the label in another manner, such as by IR or direct electrical contact.

In other scenarios utilizing the present invention, an intelligent label having a GPS and/or a magnetic sensing system and a fingerprint sensor can be used to authenticate and/or locate and/or record the location of an individual at given time and/or over a period of time. By way of example, an individual would periodically touch the fingerprint sensor and allow the sensor to sense her fingerprint. The intelligent label would then record this information along with the location of the label or information relating to the location of the label as provided by the GPS and/or the magnetic field sensor, along with the time this information was recorded. This information could later be read by an interrogator station and used to verify the individual's presence at or absence from a given area.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An intelligent label comprising:
   a radio frequency transponder coupled to a fingerprint sensor system; and
   a substrates, said radio frequency transponder and said fingerprint sensor system being attached to said substrate, wherein said substrate is a label, said label comprising a front side and a back side, said back side being provided with adhesive.

2. An intelligent label comprising:
   a radio frequency transponder coupled to a fingerprint sensor system; and a substrate, said substrate comprising a liner and a face stock, wherein said radio frequency transponder and a portion of said fingerprint sensor system are positioned between said liner and said face stock, said liner being secured to said face stock.

3. The label of claim 2, wherein all of said fingerprint sensor is positioned between said liner and said face stock.

4. An intelligent label comprising:
a radio frequency transponder coupled to a fingerprint sensor system; and
a substrate, said substrate comprising a liner and a face stock, wherein said radio frequency transponder and a portion of said fingerprint sensing system is positioned between said liner and said face stock, said liner or said face stock being secured to at least one of said radio frequency transponder and said fingerprint sensor system.

5. The label of claim 4, wherein all of said fingerprint sensor is positioned between said liner and said face stock.

6. The label of claim 4, wherein said liner and said face stock are secured to at least one of said radio frequency transponder and said fingerprint sensor system.

7. A method of making an intelligent label, comprising the steps of:
obtaining a substrate comprising a pressure sensitive face stock and a release liner;
delaminating said substrate by peeling off said release liner to expose an adhesive on said pressure sensitive face stock;
obtaining a continuous web comprising radio frequency transponders coupled to fingerprint sensor systems;
cutting said web to produce web cuttings, each web cutting comprising at least one radio frequency transponder coupled to at least one fingerprint sensor system;
transferring a web cutting to the adhesive exposed on said pressure sensitive face stock of said substrate; and
relaminating said release liner onto said pressure sensitive face stock to cover said web cutting in the area around at least a portion of the fingerprint sensor system.

8. A method of making an intelligent label, comprising the steps of:
obtaining a substrate comprising a pressure sensitive face stock and a release liner;
delaminating said substrate by peeling off said release liner to expose said pressure sensitive face stock;
pattern coating said pressure sensitive face stock with a hot melt adhesive;
obtaining a continuous web comprising radio frequency transponders coupled to fingerprint sensor systems;
cutting said web to produce web cuttings, each web cutting comprising at least one radio frequency transponder coupled to at least one fingerprint sensor system;
transferring a web cutting to said pressure sensitive face stock of said substrate; and
relaminating said release liner onto said pressure sensitive face stock to cover said web cutting in the area around at least a portion of the fingerprint sensor system.

9. A method of making an intelligent label, comprising the steps of:
obtaining a non-pressure sensitive substrate;
obtaining a laminate;
pattern coating said non-pressure sensitive substrate with an adhesive;
obtaining a continuous web comprising radio frequency transponders coupled to fingerprint sensor systems;
cutting said web to produce web cuttings, each web cutting comprising at least one radio frequency transponder coupled to at least one fingerprint sensor system;
transferring a web cutting to one of said laminate and said non-pressure sensitive substrate; and
pressing said non-pressure sensitive substrate onto said laminate to cover said web cutting in the area around at least a portion of the fingerprint sensor system.

10. The method of verifying access to an object, comprising:
obtaining an intelligent label comprising a radio frequency transponder coupled to a fingerprint sensor system, said radio frequency transponder and said fingerprint sensor system being attached to a substrate;
attaching or inserting said intelligent label to the object; and
reading the fingerprint of a person accessing the object.

11. The method as defined in claim 10, wherein reading the fingerprint comprises obtaining information relating to a distinct pattern of the fingerprint.

12. The method as defined in claim 10, wherein reading the fingerprint comprises contacting the fingerprint sensor system with a human finger.

13. The method as defined in claim 10, further comprising comparing information relating to the read fingerprint to information stored in a memory of the label and indicating with an indicator on the label whether said information relating to said read fingerprint is the same as the information stored in said memory.

14. The method as defined in claim 10, further comprising recording information about the read fingerprint in a memory in the label.

15. The method as defined in claim 10, further comprising removing said label or a portion of said label from said object after reading the fingerprint and sending said removed label or said removed portion of said label to a records location.

16. The method as defined in claim 15, wherein the radio frequency transponder relays information relating to said recorded information about the read fingerprint to an electronic storage device.

17. The method as defined in claim 10, wherein the radio frequency transponder relays information relating to said recorded information about the read fingerprint to an electronic storage device.

18. The method as defined in claim 10, further comprising comparing information relating to the read fingerprint to stored information relating to a fingerprint and indicating whether said information relating to said read fingerprint is the same as the stored information relating to a fingerprint.

19. The method as defined in claim 10, wherein the tracking step comprises:
receiving signals from an appropriate number of GPS satellites;
processing said signals into location data; and
transmitting said location data.

20. The method as defined in claim 19, further comprising transmitting said data relating to said read fingerprint and said location data, wherein an interrogation station receives said transmitted location data and said transmitted fingerprint data.

21. The method of verifying access to an object, comprising the steps of:
obtaining an intelligent label comprising a radio frequency transponder coupled to a fingerprint sensor system, said radio frequency transponder and said fingerprint sensor system being attached to a thin sheeted substrate;

attaching or inserting said intelligent label to the object to which access is to be verified; and verifying access to said object.

22. An intelligent label comprising:

a radio frequency transponder coupled to a magnetic field sensing system; and a substrate, said substrate comprising a liner and a face stock, wherein said radio frequency transponder and said magnetic field sensing system are positioned between said liner and said face stock, said liner being secured to said face stock.

23. An intelligent label comprising:

a radio frequency transponder coupled to a magnetic field sensing system; and a substrate, said substrate comprising a liner and a face stock, wherein said radio frequency transponder and said magnetic field sensing system is positioned between said liner and said face stock, said liner or said face stock being secured to at least one of said radio frequency transponder and said magnetic field sensing system.

24. The label of claim 23, wherein said liner and said face stock is secured to at least one of said radio frequency transponder and said magnetic field sensing system.

25. A method of making an intelligent label, comprising the steps of:

obtaining a substrate comprising a pressure sensitive face stock and a release liner;

delaminating said substrate by peeling off said release liner to expose an adhesive on said pressure sensitive face stock;

obtaining a continuous web comprising radio frequency transponders coupled to magnetic field sensing systems;

cutting said web to produce web cuttings, wherein each web cutting comprises at least one radio frequency transponder coupled to at least one magnetic field sensing system;

transferring a web cutting to the adhesive exposed on said pressure sensitive face stock of said substrate; and relaminating said release liner onto said pressure sensitive face stock to cover said web cutting.

26. A method of making an intelligent label, comprising the steps of:

obtaining a substrate comprising a pressure sensitive face stock and a release liner;

delaminating said substrate by peeling off said release liner to expose said pressure sensitive face stock;

pattern coating said pressure sensitive face stock with a hot melt adhesive;

obtaining a continuous web comprising radio frequency transponders coupled to magnetic field sensing systems;

cutting said web to produce web cuttings, each web cutting comprising at least one radio frequency transponder coupled to at least one magnetic field sensing systems;

transferring a web cutting to said pressure sensitive face stock of said substrate; and relaminating said release liner onto said pressure sensitive face stock to cover said web cutting.

27. A method of making an intelligent label, comprising the steps of:

obtaining a non-pressure sensitive substrate;

obtaining a laminate;

pattern coating said non-pressure sensitive substrate with an adhesive;

obtaining a continuous web comprising radio frequency transponders coupled to magnetic field sensing systems;

cutting said web to produce web cuttings, each web cutting comprising at least one radio frequency transponder coupled to at least one magnetic field sensing systems;

transferring a web cutting to one of said laminate and said non-pressure sensitive substrate; and pressing said non-pressure sensitive substrate onto said laminate to cover said web cutting.

28. A method of tracking or identifying an object, comprising the steps of:

obtaining an intelligent label including:

a radio frequency transponder coupled to a magnetic field sensing system adapted to determine at least one of (a) direction, (b) heading (c) position and (d) movement based on a sensed magnetic field; and a thin sheeted substrate, said radio frequency transponder and said magentic field sensing system being attached to said substrate;

attaching or inserting said intelligent label to the object to be tracked or identified; and tracking or identifying said object to be tracked or identified, wherein the tracking step comprises:

sensing a magnetic field;

processing said sensed magnetic field into location data; and transmitting said location data.

29. A method of tracking or identifying an object, comprising the steps of:

obtaining an intelligent label including:

a radio frequency transponder coupled to a magnetic field sensing system adapted to determine at least one of (a) direction, (b) heading (c) position and (d) movement based on a sensed magnetic field; and a thin sheeted substrate, said radio frequency transponder and said magnetic field sensing system being attached to said substrate;

attaching or inserting said intelligent label to the object to be tracked or identified; and tracking or identifying said object to be tracked or identified, wherein the tracking step comprises:

sensing a magnetic field;

processing said sensed magnetic field into movement data; and transmitting said movement data.

30. The method as defined in claim 28, wherein an interrogation station receives said transmitted location data.

31. A method of tracking or identifying an object, comprising the steps of:

obtaining an intelligent label including:

a radio frequency transponder coupled to a magnetic field sensing system adapted to determine at least one of (a) direction, (b) heading (c) position and (d) movement based on a sensed magnetic field; and a thin sheeted substrate, said radio frequency transponder and said magnetic field sensing system being attached to said substrate;

attaching or inserting said intelligent label to the object to be tracked or identified; and tracking or identifying said object to be tracked or identified, wherein the identifying step comprises transmitting an identification signal.

32. A label comprising:

a radio frequency transponder coupled to a magnetic field sensing system adapted to determine at least one of (a) direction, (b) heading (c) position and (d) movement based on a sensed magnetic field; and a thin sheeted substrate, said radio frequency transponder and said magnetic field sensing system being attached to said substrate, the label further comprising a global positioning system receiver.

33. An intelligent label comprising:

a radio frequency transponder coupled to a global positioning system receiver; and a thin sheeted substrate, said radio frequency transponder and said global positioning system receiver being attached to said substrate.

34. A method of making an intelligent label, comprising the steps of:

obtaining a radio frequency transponder coupled to a global positioning system receiver; and attaching said radio frequency transponder and said global positioning system receiver to a thin sheeted substrate.

35. A method of making an intelligent label, comprising the steps of:

obtaining a non-pressure sensitive substrate;

obtaining a laminate;

pattern coating said non-pressure sensitive substrate with an adhesive;

obtaining a continuous web comprising radio frequency transponders coupled to global system receivers;

cutting said web to produce web cuttings, each web cutting comprising at least one radio frequency transponder coupled to at least one global positioning system receiver;

transferring a web cutting to one of said laminate and said non-pressure sensitive substrate; and pressing said non-pressure sensitive substrate onto said laminate to cover said web cutting.

* * * * *